United States Patent Office 3,637,864
Patented Jan. 25, 1972

3,637,864
BIS-(HYDROXYALKYL)-SULFIDES AND PREPARATION THEREOF
Wilfried Umbach, Langenfeld, Rhineland, Rainer Mehren, Neuss, Rhineland, and Werner Stein, Erkrath-Unterbach, Germany, assignors to Henkel & Cie, G.m.b.H., Dusseldorf, Germany
No Drawing. Filed Apr. 22, 1969, Ser. No. 818,441
Claims priority, application Germany, Apr. 23, 1968, P 17 68 266.5
Int. Cl. C07c 149/18
U.S. Cl. 260—609 A   5 Claims

ABSTRACT OF THE DISCLOSURE

A process for the preparation of bis-(hydroxyalkyl)-sulfides which comprises the steps of reacting an epoxide selected from the group consisting of mono-vicinal-epoxy-epoxide compounds and poly-vicinal-epoxy epoxide compounds with substantially the stoichiometric amount of hydrogen sulfide, in the absence of solvents at a temperature of between about 40° C. and 200° C. and normal pressures in the presence of from about 0.01% to 10% by weight, based on said epoxide, of a strongly basic catalyst, and recovering said bis(hydroxyalkyl)-sulfides.

Bis-(hydroxyalkyl)-sulfides of the formula

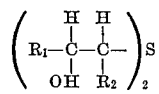

wherein $R_1$ is a member having from 1 to 22 carbon atoms selected from the group consisting of alkyl and alkylol, $R_2$ is a member selected from the group consisting of hydrogen, alkyl having from 1 to 21 carbon atoms and alkylol having from 1 to 21 carbon atoms with the proviso that the sum of the carbon atoms in $R_1$ and $R_2$ is between 6 and 22 are disclosed. The compounds are useful as antioxidants, insecticides, fungicides and intermediates.

THE PRIOR ART

It is known that bis-(hydroxyalkyl)-sulfides occur as by-products while preparing hydroxyalkyl mercaptans from epoxide compounds and hydrogen sulfide or hydrogen persulfides. Thus far, the only method known, in order to produce, by means of a direct reaction of hydrogen sulfide with epoxide compounds, almost quantitative yields of bis-(hydroxyalkyl)-sulfides is the corresponding reaction with ethyleneoxide. A method producing higher molecular weight bis-(hydroxy-alkyl)-sulfides in a single step method with high yields from the corresponding epoxide compounds and hydrogen sulfide, has thus far, not been described in the art.

OBJECTS OF THE INVENTION

An object of the present invention is the development of a generally utilizable method for the production of bis-(hydroxyalkyl)-sulfides in a single step from epoxides and hydrogen sulfide.

Another object of the invention is the development of a process for the preparation of bis-(hydroxyalkyl)-sulfides which comprises the steps of reacting an epoxide selected from the group consisting of mono-vicinal-epoxy epoxide compounds and poly-vicinal-epoxy epoxide compounds with substantially the stoichiometric amount of hydrogen sulfide, in the absence of solvents at a temperature of between about 40° C. and 200° C. and normal pressures in the presence of from about 0.01% to 10% by weight, based on said epoxide, of a strongly basic catalyst, and recovering said bis-(hydroxyalkyl)-sulfides.

A further object of the invention is the obtention of bis-(hydroxyalkyl)-sulfides of the formula

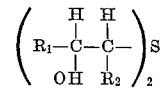

wherein $R_1$ is a member having from 1 to 22 carbon atoms selected from the group consisting of alkyl and alkylol, $R_2$ is a member selected from the group consisting of hydrogen, alkyl having from 1 to 21 carbon atoms and alkylol having from 1 to 21 carbon atoms with the proviso that the sum of the carbon atoms in $R_1$ and $R_2$ is between 6 and 22.

These and other objects of the invention will become more apparent as the description thereof proceeds.

DESCRIPTION OF THE INVENTION

These objectives are achieved in that epoxides are reacted with hydrogen sulfide, in the absence of solvents at temperatures of between about 40° C. and 200° C., preferably 50° C. and 120° C., in the presence of 0.01% to 10% by weight with reference to the amount of epoxide used, of a strongly basic catalyst.

The reaction of epoxides with hydrogen sulfide is effected under normal pressure and the hydrogen sulfide is added slowly in the amount which is necessary for the stoichiometric reaction.

The strongly basic catalysts are preferably mixed with the epoxide before addition of the hydrogen sulfide and the mixture is heated to the reaction temperature. Preferably, it is maintained at the reaction temperature by controlling the rate of addition of hydrogen sulfide.

The strongly basic catalysts are added in an amount of from 0.01% to 10% by weight, preferably from 0.05% to 7% by weight, based on the weight of the epoxide. These strongly basic catalysts may be inorganic, such as alkali metal or alkaline earth metal hydroxides or organic such as alkali metal lower alcoholates, for example sodium methylate, sodium ethylate, etc.; alkali metal phenolates, such as sodium phenolate, etc.; tertiary onium bases, such as sulfonium hydroxides, for example, trimethylsulfonium hydroxide, tris- ($\beta$ - hydroxyethyl)-sulfonium hydroxide, dodecyldimethylsulfonium hydroxide, etc.; quaternary onium bases, such as phosphonium hydroxides, for example tetramethylphosphonium hydroxide, etc., and ammonium hydroxides, for example, tetraethylammonium hydroxide, benzyltrimethylammonium hydroxide, etc.; and the dimethylates of the reaction product obtained, of the reaction in a methanolic solution of 1 mol of N,N,N',N' tetramethylhexamethylene diamine with 3 mols of propyleneoxide. Weak bases, such as hydrazines or amines are less suitable as catalysts due to their lower basicities.

Monoepoxy and multiepoxy, terminal or non-terminal aliphatic epoxides can be used in the invention as starting materials. The aliphatic epoxides can be straight or branched chained, or may be interrupted or substituted in the alkyl chains by hetero atoms or by hetero atom groups. Moreover, monoepoxy or multiepoxy, substituted or unsubstituted cycloaliphatic epoxides can be used. Also, mixtures of various epoxides can be utilized, as well as mixtures, which have, in addition to epoxy groups, additional functional groups which are inert to hydrogen sulfide. Such mixtures can be, for instance epoxized cracked olefins, in which in addition to various epoxides, paraffins and non-reacted olefins can be present, furthermore epoxized fatty acid and fatty alcohol mixtures, which can be obtained from natural unsaturated fats and oils.

Preferably, epoxides with 8 to 24 carbon atoms, or the corresponding mixtures are utilized. These epoxides are alkene-vic.-oxides having 8 to 24 carbon atoms, for example, n-octene-oxide-1,2 n-tetracosene-oxide-1,2, 2-ethylhexene-oxide-1,2, n-octene-oxide-2,3, etc.; alkadiene-di-vic.-oxides having 8 to 24 carbon atoms, for example, n-octadiene-dioxide-1,2-7,8, etc.; lower alkyl esters of vic.-epoxy-alkanoic acids having from 8 to 24 carbon atoms, for example, methyl 9,10-epoxy-octadecanoate, etc.; alkoxyalkene-vic.-oxides having from 8 to 24 carbon atoms, for example, 2 - ethylhexyl-glycidylether, etc.; hydroxyalkene-vic.-oxides having from 8 to 24 carbon atoms, for example, 2,3-epoxy-octanol-4, etc.; and cycloalkene-vic.-oxides having from 8 to 24 carbon atoms, for example, cyclododecene-vic.-oxide.

Starting materials, according to the method known by the art are made accessible by epoxidization of the corresponding olefinically unsaturated compounds, for instance with peracetic acid.

With regard to the execution of the reaction, the epoxide is preferably charged into the reactor and then the catalyst in the amount necessary is added. The mixture is then heated to the reaction temperature desired. Then the hydrogen sulfide is slowly introduced under agitation, so that the hydrogen sulfide introduced is completely absorbed by the reaction mixture. The end of the reaction is determined by the decrease of the heat of the reaction, and is completed the moment the reaction mixture does not accept any further hydrogen sulfide. Generally, the reaction period lasts 3 to 4 hours. The working up of the reaction products can be effected in the usual manner. For instance, the raw product can be introduced into ice water. After neutralization of the catalyst the separated product can be isolated. If need be, the product can be purified by recrystallization. Where bis-(hydroxyalkyl)-sulfides with a low melting point are produced, they can be worked up by distillation. In this method, the catalyst is neutralized by treating the raw products with diluted acid. A water-immiscible solvent is then added, the aqueous phase is separated, and the organic phase is fractionally distilled.

Products under the method are achieved in a very pure form, and in practically quantitative yields, with regard to the epoxide employed.

They can be used for various purposes. They can be used in the control of pests as insecticides and fungicides. They are effective antioxidates for rubber formulations. They can be used furthermore as emulsifiers. They are valuable starting materials for numerous syntheses, on the basis of their polyfunctionality. Of particular interest are their transester and transether products which, according to the selection of the reaction partner, may be employed in the field of washing and textile treatment, as prewashing and dispersing agents, and as plasticizers in the plastics industry, or as additions to lubricant oils and lubricant materials.

The following specific examples are illustrative of the practice of the invention. They are not, however, to be deemed limitative in any manner.

EXAMPLE 1

55.3 gm. (0.3 mol) of n-dodecene-oxide - 1,2 were mixed with 3.7 gm. of sodium ethylate (6.7% by weight of catalyst with reference to the amount of epoxide used). The mixture was then heated at 52° C. Subsequently, hydrogen sulfide was introduced under agitation in a slow manner, so that the temperature of the reaction mixture remained constant, and the amount of hydrogen sulfide introduced was completely absorbed. The hydrogen sulfide absorption was controlled by means of a bubble counter disposed downstream of the reactor. After 3 hours, the reaction mixture did not accept any further hydrogen sulfide. The colorless, solid raw product was introduced into ice water and neutralized with diluted sulfuric acid. The product was then recovered by filtration. The yield obtained was quantitative. After recrystallization from ethanol, the melting point was 82°–83° C. The analysis data obtained and the molecular weight estimated osmometrically in benzene were in good accordance with the values calculated for bis(2-hydroxydodecyl)-sulfide. The structural formula was confirmed by the nuclear resonance spectra.

Analysis data.—Calculated (percent): C, 71.58; H, 12.51; S, 7.96. Found (percent): C, 71.56; H, 12.70; S, 7.90.

Molecular weight: Calculated: 402.7. Found: 395.0.

EXAMPLE 2

55.3 gm. (0.3 mol) of n-dodecene-oxide-1,2, were mixed with 1.7 gm. (3% by weight of catalyst) of the reaction product, prepared in a methanolic solution, of 1 mol of N,N,N′,N′ - tetramethylhexamethylenediamine with 3 mols of propylene-oxide. The mixture was then heated to 77° C. Subsequently, hydrogen sulfide was added at such a rate under agitation, as the reaction mixture was able to accept. The rate of the addition was adjusted in such a manner that the temperature of the reaction mixture remained constantly in the range of 75° C. to 80° C. After 4 hours the reaction mixture did not accept any further hydrogen sulfide. The working up of the reaction product was effected according to Example 1. The yield was 87% of the theory. The analysis of the bis-(2-hydroxydodecyl)-sulfide was the following:

Calculated (percent): C, 71.58; H, 12.51; S, 7.96. Found (percent): C, 71.80; H, 12.99; S, 7.90.

The molecular weight osmometrically determined in benzene was 396.0 (calculated value—402.7).

EXAMPLE 3

51.2 gm. (0.4 mol) of n-octene-oxide-1,2 were mixed with 2.6 gm. (5% by weight) of sodium methylate. The mixture was heated to 70° C. Subsequently, hydrogen sulfide was introduced under agitation in such a manner that the reaction mixture was barely able to accept it. The temperature was maintained within the range of 70° C. to 80° C. The reaction was completed after 4 hours. The working up was effected in accordance with Example 1. The yield was 85% of the theory. The melting point of the product was 54°–55° C. after recrystallization from the aqueous acetone. The sulfur content was in accordance with that calculated for bis-(2-hydroxyoctyl)-sulfide.

Calculated (percent): S, 11.04. Found (percent): S, 10.75.

The structural formula was confirmed by the nuclear resonance spectrum.

EXAMPLE 4

Analogous to Example 3, 56.4 gm. (0.21 mol) of n-octadecene-oxide-1,2 were reacted in the presence of 2.8 gm. (5% by weight) of sodium methylate, with hydrogen sulfide. The reaction product was achieved in a quantitative yield. The melting point of the product was 89°–92° C., after recrystallization from ethanol. The sulfur content of the product was in accordance with that calculated for bis-(2-hydroxyoctadecyl)-sulfide.

Calculated (percent): S, 5.62. Found (percent): S, 5.91.

The structual formula was confirmed by the nuclear resonance spectrum.

The advantages of the invention exist primarily in that bis-(hydroxyalkyl)-sulfides have been made available in high yields at a single step process from the starting materials of epoxide and hydrogen sulfide. Hitherto, according to the state of technology, it was unexpected that the reaction of an epoxide with hydrogen sulfide could be attained in such an inexpensive manner, i.e. an almost complete formation of bis-(hydroxyalkyl)-sulfide. This fact is of particular importance for the preparation of higher molecular weight bis-(hydroxyalkyl)-sulfides, not previously described. Thus, new chemical materials were made accessible by the invention.

The preceding specific embodiments are illustrative of the practice of the ivention. It is to be understood, however, that other expedients known to those skilled in the art may be employed without departing from the spirit of the invention.

We claim:
1. Bis-hydroxyalkyl-sulfides of the formula

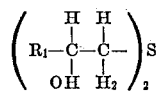

wherein $R_1$ is alkyl having from 6 to 22 carbon atoms.

2. A process for the preparation of bis-(hydroxyalkyl)-sulfides which consists essentially of the steps of reacting an epoxide having 8 to 24 carbon atoms selected from the group consisting of mono-vicinal-epoxy epoxide compounds and poly-vicinal-epoxy epoxide compounds, in the absence of solvents at a temperature of between 40° C. and 200° C., and normal pressures in the presence of from about 0.01% to 10% by weight, based on said epoxide, of a strongly basic catalyst selected from the group consisting of alkali metal hydroxides, alkaline earth metal hydroxides, alkali metal lower alkanolates, alkali metal phenolates, tertiary onimum hydroxides, quaternary onium hydroxides and the reaction product of the reaction in a methanolic solution of 1 mol of N,N,N',N'-tetramethyl-hexamethylenediamine with 3 mols of propylene oxide, with substantially the stoichiometric amount of hydrogen sulfide, added slowly to the reactants, and a recovering said bis-(hydroxyalkyl)-sulfides.

3. The process of claim 2 wherein said temperature is maintained between 50° C. and 120° C.

4. The process of claim 2 wherein said strongly basic catalysts are present in an amount of from 0.05% to 7% by weight, based on said epoxide.

5. The process of claim 2 wherein said epoxides are alkene-oxides-1,2 having from 8 to 24 carbon atoms.

References Cited

UNITED STATES PATENTS

| | | | |
|---|---|---|---|
| 3,086,997 | 11/1961 | Warner | 260—609 |
| 3,394,192 | 7/1968 | Jones | 260—609 |

OTHER REFERENCES

Culvenor: "J. Chem. Soc." (1949) pp. 278–282.

Berbe: "Bull. Soc. Chim. Bdg." vol. 59, pp. 449–464 (1950).

CHARLES B. PARKER, Primary Examiner

D. R. PHILLIPS, Assistant Examiner

U.S. Cl. X.R.

252—352, 406; 260—814; 424—337